W. KAISER.
ROAD AND LAND LEVELING MACHINE.
APPLICATION FILED DEC. 17, 1908.
941,929.
Patented Nov. 30, 1909.
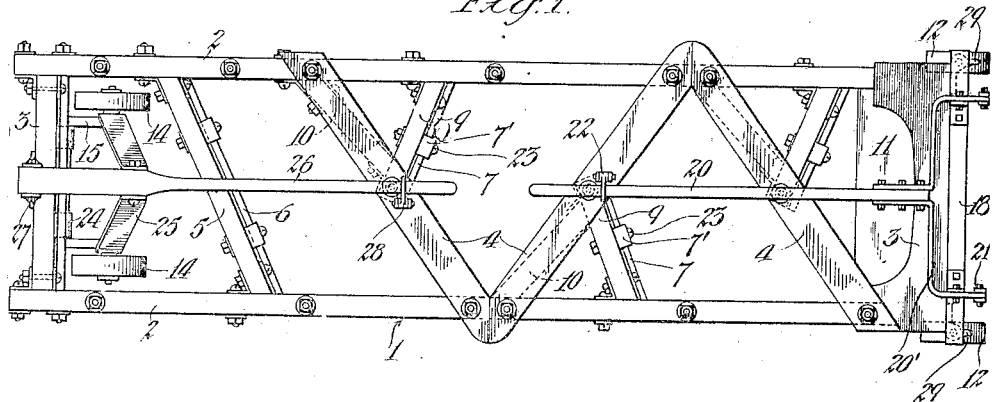
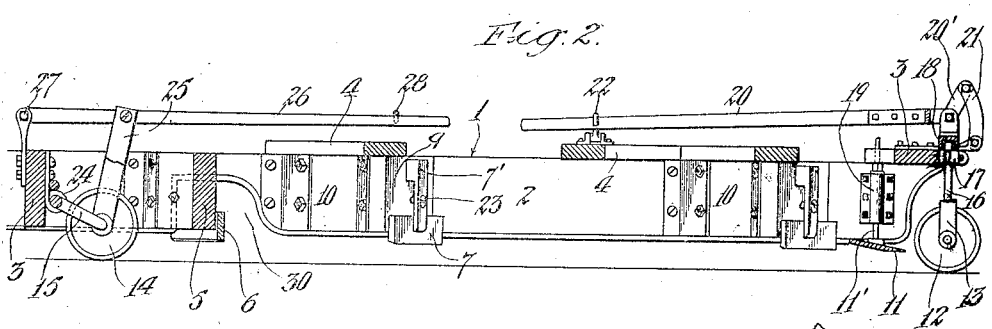
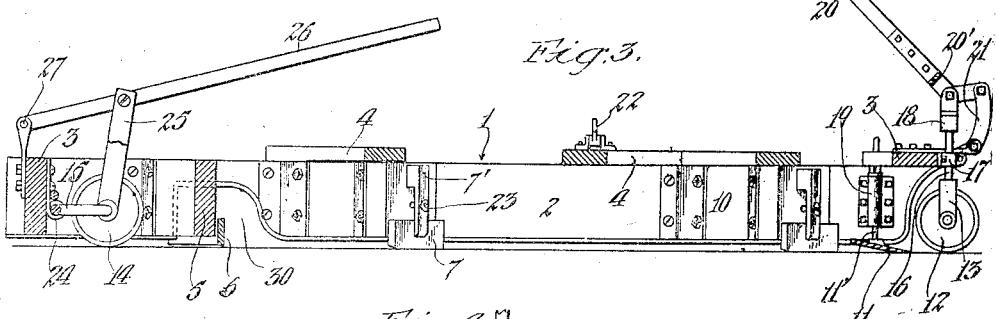
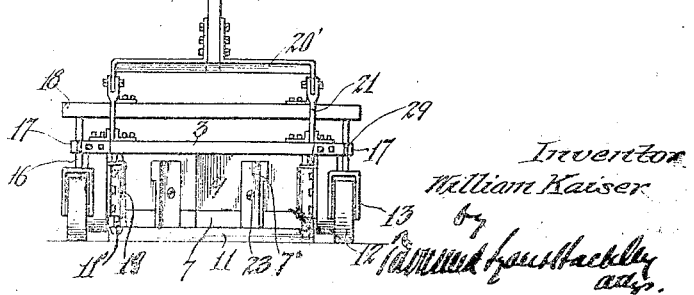
Witnesses:
Inventor
William Kaiser

UNITED STATES PATENT OFFICE.

WILLIAM KAISER, OF LOS ANGELES, CALIFORNIA.

ROAD AND LAND LEVELING MACHINE.

941,929.  Specification of Letters Patent. Patented Nov. 30, 1909.

Application filed December 17, 1908. Serial No. 468,076.

*To all whom it may concern:*

Be it known that I, WILLIAM KAISER, a citizen of the United States, residing at Los Angeles, in the county of Los Angeles and State of California, have invented a new and useful Road or Land Leveling Machine, of which the following is a specification.

This invention relates to a machine for leveling roads or generally for leveling any land surface, and the main object of the present invention is to provide a machine for this purpose of simple, cheap and efficient construction.

A further object of the invention is to provide, in a machine of this character, means for facilitating traction of the machine from one place to another by temporarily removing the leveling devices from contact with the ground.

Another object of the invention is to provide for enabling the soil cutting means to be put out of operation, without interfering with the operation of the spreading means.

Another object of the invention is to facilitate turning of the machine during operation.

A further object of the invention is to enable the spreading means to be adjusted so as to level or smooth the soil with or without transfer thereof to one side.

Other objects of the invention will appear hereinafter.

Referring to the drawings: Figure 1 is a plan of a machine embodying the invention. Fig. 2 is a vertical longitudinal section showing the machine in position for transportation, the leveling mechanism being lifted out of operation. Fig. 3 is a view similar to Fig. 2, showing the machine in position for scraping. Fig. 4 is a front end elevation.

1 designates the main frame of the machine which may be substantially rectangular, said frame comprising a longitudinal bar 2, at each side, cross bars 3 at the front and rear ends and diagonal cross bars 4. Another cross bar 5 extends diagonally across near the rear end and carries the rear or spreading scraper 6 which is formed as a flat blade extending practically the full width of the machine. Other scrapers 7 are provided forward of this spreading scraper, two scrapers 7 extending obliquely inwardly and rearwardly from one of the side bars 2, being supported by brackets 9, having braces 10 extending obliquely rearward from their inner ends to the side bar 2 aforesaid. Cross bars 4 also serve to support the brackets 9. A scraper 7 on the other side of the machine extends obliquely inward and rearward from the side bar 1 on said other side and is similarly supported by a bracket 9 and brace 10. The scraper 8 is intermediate between the two scrapers 7 so that the position of the scrapers alternates on the two sides of the machine. Each scraper 7 stands in a substantially vertical plane and is mounted on its bracket 9 by shanks 7' extending upwardly from the scraper and bearing at its upper end on the bracket 9. A set screw 23 being provided to enable adjustment of the height of the blade. A scraping knife or cutting blade 11 is provided, forward of all the scrapers aforesaid, this blade being supported by rods 11' mounted by supports 19 on side bars 1 of the main frame. This cutting blade lies nearly flat with the ground, so as to slice off a section of the soil.

To support the machine while being transported from one place to another and hold the scraper mechanism from operation during such transportation supporting wheels or trucks are provided, there being, for example, a pair of wheels 12 at the forward end mounted on a frame 13 and a pair of wheels 14 at the rear end mounted on a frame 15, said frames being connected to the main frame 1 to permit of vertical relative adjustment of the scraper frame 1 and the supporting wheels. Thus the wheel frame 13 at the forward end may be provided with two posts 16 sliding in vertical guides 17 on the scraper frame 1, the upper ends of said posts being connected by a cross bar or yoke 18, and a lever 20 pivoted by its yoke 20' to links 21 pivoted on the main frame being also pivoted to said cross bar to hold the wheel frame and the front supporting wheels downwardly relatively to the main frame 1. A pivoted latch or catch 22 on one of the diagonal cross bars 4, is provided to engage said lever near its outer end to hold the same in depressed position. The rear wheel frame 15 is in the form of a bail, being pivotally mounted on bearings 24 on the main frame and connected by links 25 with a depressing lever 26 pivoted at 27 to the main frame 1, a retaining catch 28 being provided for this lever. The levers 20, 26 extend from their connections with the main frame toward the mid length of the main frame, so as to be conveniently operated from the same point, namely, the middle of the main frame, and the retaining catches 22, 28 are also located adjacent to this portion of the main frame so that all the operations of adjustment can be effected from the same part of the machine.

In using the machine as a leveler the levers 20, 26 are released as shown in Fig. 3 so that the weight of the main frame and other parts come on the scrapers 11, 7, 6, the machine being then adapted for use in leveling land, etc. As the machine is drawn forward by any suitable traction means, connected thereto by connecting means 29, the knife or forward scraper 11 shaves off the top layer of dirt and the following scrapers 7 acting successively to throw the dirt toward the center, after which the final or spreading scraper 6 levels the entire surface covered by the machine. One of the side bars of the frame being cut away as shown at 30 to provide passage for the dirt delivered laterally by this last or leveling scraper. In case it is not desired to cast this dirt to one side, the rear end of the frame can be raised by depressing lever 26, so as to lift the spreading scraper 6, above the ground, bringing the forward devices 11, 6 in operation. On the other hand if it is desired to level without cutting the forward end may be raised by lever 20 and wheels 12, to lift cutting blade 11 from the ground. This may also be done when a turn is to be made.

When it is desired to transport the machine without operation of the scrapers both the levers 20, 26 are depressed and are retained by catches 22, 28, forcing the wheel frames 13, 15 and the wheels 12, 13 carried thereby, downwardly with relation to the main frame 1, or in other words, raising the main frame on said wheels. Said wheels then rest on the ground and serve to support the main frame and scrapers 11, 6, 7 carried thereby out of contact with the ground. The machine may then be drawn by any suitable traction means to any desired position for example, along a roadway, without interference with the tractions by the scrapers or leveling devices.

What I claim is:

1. A leveling machine comprising a main frame, a cutting scraper near the forward end of said frame extending across the frame, spreading scraper means extending across the frame at the rear of the cutting scraper, a wheel frame at each end of the main frame and movably connected to the main frame, wheels carried by each wheel frame, means for shifting the position of the wheel frame at each end relatively to the main frame to raise or lower the main frame, and means for retaining the shifting means to hold the main frame in raised position.

2. A leveling machine comprising a main frame, leveling scrapers carried thereby, supporting wheels movable relatively to the frame and means for raising or lowering the frame relatively to the supporting wheels to support the scrapers and frame on the wheels or to allow the scrapers to rest on the ground, said means comprising at each end of the machine a frame mounted to slide vertically on the main frame and carrying the said wheels, a lever pivoted on the main frame and connected to the wheel frame and extending toward the midlength of the main frame, and means near the midlength of the main frame for retaining said lever in position to raise the main frame on the said wheels.

3. A leveling machine comprising a frame, a cutting scraper near the forward end of the frame extending directly across the frame, a spreading scraper near the rear end of the frame extending obliquely across the frame, a plurality of intermediate scrapers extending alternately from the sides of the frame obliquely rearward to the middle of the frame, wheels on which the frame is mounted, a wheel-carrying frame at each end of the frame of the machine and movably connected to the machine frame, and means for shifting the position of the wheel frame at each end, relatively to the machine frame.

In testimony whereof, I have hereunto set my hand at Los Angeles California this 10th day of December 1908.

WILLIAM KAISER.

In presence of—
ARTHUR P. KNIGHT,
FRANK L. A. GRAHAM.